US012641518B2

(12) United States Patent
Qin et al.

(10) Patent No.: US 12,641,518 B2
(45) Date of Patent: May 26, 2026

(54) WIRELESS COMMUNICATION DEVICE, WIRELESS REPEATER, AND WIRELESS ACCESS POINT

(71) Applicant: REALTEK SEMICONDUCTOR CORPORATION, Hsinchu (TW)

(72) Inventors: Jun-Jie Qin, Suzhou (CN); Hong-Feng Shi, Suzhou (CN); Quan Yang, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 317 days.

(21) Appl. No.: 18/229,191

(22) Filed: Aug. 2, 2023

(65) Prior Publication Data

US 2024/0147345 A1     May 2, 2024

(30) Foreign Application Priority Data

Oct. 28, 2022    (CN) .......................... 202211335771.7

(51) Int. Cl.
*H04W 40/22*          (2009.01)
*H04W 84/12*          (2009.01)
(52) U.S. Cl.
CPC ............ *H04W 40/22* (2013.01); *H04W 84/12* (2013.01)
(58) Field of Classification Search
CPC ..... H04W 40/22; H04W 84/12; H04W 88/02; H04W 12/03; H04W 12/041;
(Continued)

(56) References Cited

U.S. PATENT DOCUMENTS 8,233,424  B2    7/2012  Tamura
11,963,075 B1 *  4/2024  Bahr ..................... H04W 76/15
(Continued)

FOREIGN PATENT DOCUMENTS

CN        101610513  B      8/2012

OTHER PUBLICATIONS

IEEE: An Enhanced Bridged-Based Multi-hop Wireless Network Implementation, Stefano et al., Performance Engineering Lab, School of Computer Science and Informatics, University College Dublin, Dublin, Ireland (Year: 2010).*
(Continued)

*Primary Examiner* — Mohammed S Chowdhury
(74) *Attorney, Agent, or Firm* — WPAT, PC

(57)          ABSTRACT
A wireless repeater is in communication with a wireless communication device and a wireless access point (AP) and includes a packet transceiver circuit and a computing circuit. The computing circuit is configured to control the packet transceiver circuit to receive from the wireless communication device or the wireless access point a first frame that includes a first receiver address, a first transmitter address, a first destination address, and a first source address, and to control the packet transceiver circuit to send a second frame to the wireless AP or the wireless communication device, the second frame including a second receiver address, a second transmitter address, a second destination address, and a second source address. The first source address is identical to the second source address, the first destination address is identical to the second destination address, and the first receiver address is identical to the second transmitter address.

11 Claims, 5 Drawing Sheets

(58) Field of Classification Search
CPC .... H04W 12/0431; H04W 88/08; H04B 1/40;
H04B 7/155
See application file for complete search history.

(56) References Cited

U.S. PATENT DOCUMENTS

| | | | |
|---|---|---|---|
| 2014/0056209 A1* | 2/2014 | Park | H04W 16/26 |
| | | | 370/315 |
| 2014/0064184 A1* | 3/2014 | Cherian | H04W 48/16 |
| | | | 370/328 |
| 2015/0244448 A1* | 8/2015 | Seok | H04W 48/12 |
| | | | 370/315 |
| 2021/0336722 A1* | 10/2021 | Tao | H04W 40/24 |
| 2023/0049552 A1* | 2/2023 | Chitrakar | H04W 76/15 |
| 2023/0098093 A1* | 3/2023 | Hawkes | H04W 12/06 |
| | | | 370/338 |
| 2024/0072924 A1* | 2/2024 | Chu | H04L 1/0003 |
| 2024/0121602 A1* | 4/2024 | Aio | H04W 84/12 |

OTHER PUBLICATIONS

OA letter of a counterpart TW application (appl. No. 111142872) mailed on Sep. 6, 2023.

* cited by examiner

WIRELESS COMMUNICATION DEVICE, WIRELESS REPEATER, AND WIRELESS ACCESS POINT

BACKGROUND OF THE INVENTION

1. Field of the Invention

The present invention generally relates to wireless communication, and, more particularly, to the repeating of wireless signals.

2. Description of Related Art

With the development of electronic technology, more and more smart devices support wireless functions. When a wireless communication device is far from a wireless access point (AP) or blocked by a wall, the signal from the wireless AP is weakened, and the wireless communication device cannot connect directly to the wireless AP or get a better service experience. In this case, a wireless repeater is needed to repeat and amplify the wireless signal. However, the traditional wireless repeating establishment process is complex, and the wireless communication device needs to perform inquiries, identity authentication, association, and key negotiations with the wireless repeater. Moreover, when forwarding the encrypted packets, the wireless repeater needs to decrypt and encrypt the encrypted IEEE 802.11 (hereinafter referred to as 802.11) frame body in the packet, which consumes a lot of system resources and causes significant network latencies when forwarding data.

SUMMARY OF THE INVENTION

In view of the issues of the prior art, an object of the present invention is to provide a wireless communication device, a wireless repeater, and an access point (AP), so as to make an improvement to the prior art.

According to one aspect of the present invention, a wireless communication device is provided. The wireless communication device includes a packet transceiver circuit and a computing circuit. The computing circuit is coupled to the packet transceiver circuit and configured to control the packet transceiver circuit to send a first frame that includes a first receiver address, a first transmitter address, a first destination address, and a first source address, and to control the packet transceiver circuit to receive a second frame that includes a second receiver address, a second transmitter address, a second destination address, and a second source address. The first source address is identical to the second destination address, the second source address is identical to the first destination address, the first receiver address is identical to the second transmitter address, and the second receiver address is identical to the first transmitter address.

According to another aspect of the present invention, a wireless repeater is provided. The wireless repeater is in communication with a wireless communication device and a wireless access point (AP) and includes a packet transceiver circuit and a computing circuit. The computing circuit is coupled to the packet transceiver circuit and configured to control the packet transceiver circuit to receive a first frame from the wireless communication device or the wireless AP and to control the packet transceiver circuit to send a second frame to the wireless AP or the wireless communication device. The first frame includes a first receiver address, a first transmitter address, a first destination address, and a first source address. The second frame includes a second receiver address, a second transmitter address, a second destination address, and a second source address. The first source address is identical to the second source address, the first destination address is identical to the second destination address, and the first receiver address is identical to the second transmitter address.

According to still another aspect of the present invention, a wireless access point (AP) is provided. The wireless AP is in communication with a wireless repeater and includes a packet transceiver circuit and a computing circuit. The computing circuit is coupled to the packet transceiver circuit and configured to control the packet transceiver circuit to receive a first frame from the wireless repeater and to control the packet transceiver circuit to send a second frame to the wireless repeater. The first frame includes a first receiver address, a first transmitter address, a first destination address, and a first source address. The second frame includes a second receiver address, a second transmitter address, a second destination address, and a second source address. The first source address is identical to the second destination address, the second source address is identical to the first destination address, the first transmitter address is identical to the second receiver address, and the first receiver address is identical to the second transmitter address.

The technical means embodied in the embodiments of the present invention can solve at least one of the problems of the prior art. Therefore, compared to the prior art, the present invention consumes less system resources and has less network latency when forwarding data.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a wireless communication device, a wireless repeater, and a wireless access point (AP). On account of that some or all elements of the wireless communication device, the wireless repeater, and the wireless AP could be known, the detail of such elements is omitted provided that such detail has little to do with the features of this disclosure, and that this omission nowhere dissatisfies the specification and enablement requirements. A person having ordinary skill in the art can choose components or steps equivalent to those described in this specification to carry out the present invention, which means that the scope of this invention is not limited to the embodiments in the specification.

The prefixes "first," "second," . . . , etc. are used in the following discussions only to identify components or signals for ease of explanation, but do not necessarily represent the order of the components or signals.

Figure 1:
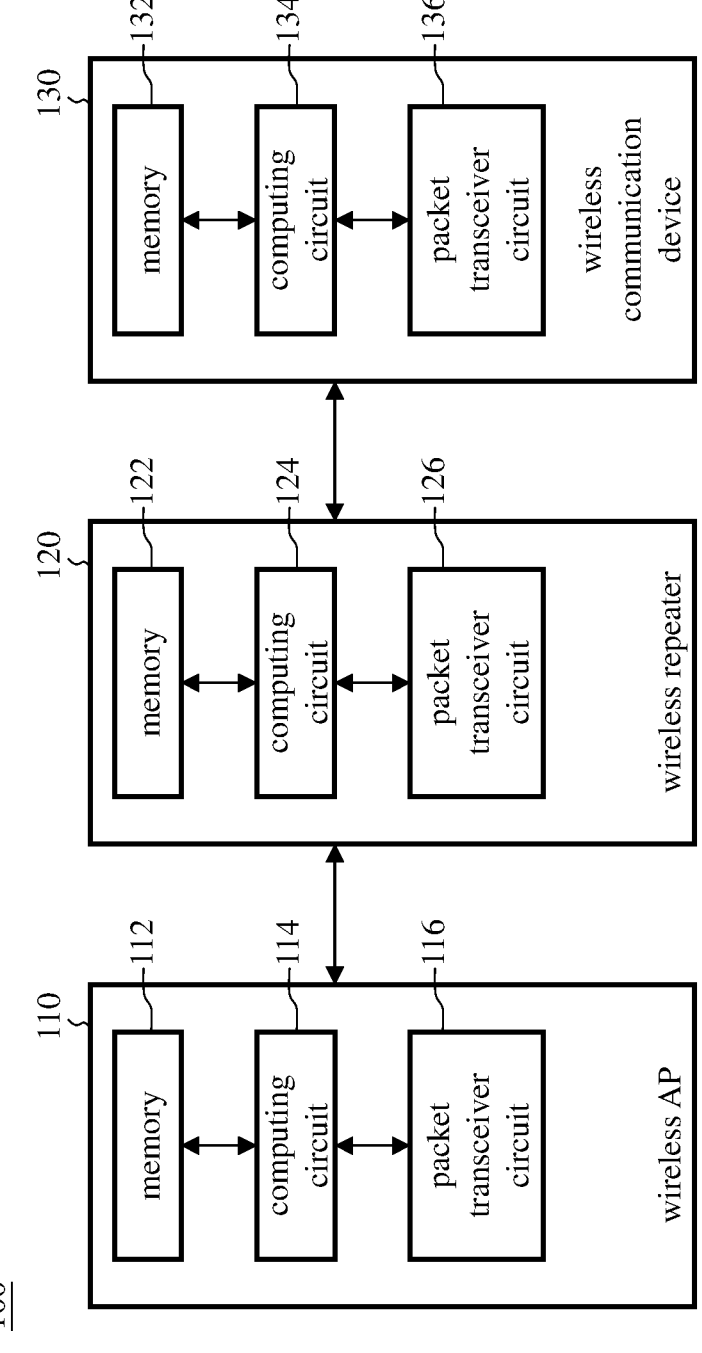
FIG. 1 is a functional block diagram of a wireless communication system according to an embodiment of the present invention.

FIG. 1 is a functional block diagram of a wireless communication system according to an embodiment of the present invention. The wireless communication system 100 includes an access point (AP) 110, a wireless repeater 120, and a wireless communication device 130. The wireless AP 110 is in communication with the wireless repeater 120, the wireless repeater 120 is in communication with the wireless communication device 130, and the wireless AP 110 is in communication with the wireless communication device 130 through the wireless repeater 120. The wireless AP 110, the wireless repeater 120, and the wireless communication device 130 belong to the same distribution system (DS). In some embodiments, the wireless communication device 130 can be regarded as a station.

The wireless AP 110 includes a memory 112, a computing circuit 114, and a packet transceiver circuit 116. The wireless repeater 120 includes a memory 122, a computing circuit 124, and a packet transceiver circuit 126. The wireless communication device 130 includes a memory 132, a computing circuit 134, and a packet transceiver circuit 136. The packet transceiver circuit 116, the packet transceiver circuit 126, and the packet transceiver circuit 136 are configured to send and receive packets. In some embodiments, the packet transceiver circuit 116, the packet transceiver circuit 126, and the packet transceiver circuit 136 each include a physical layer circuit and a media access control (MAC) circuit.

The computing circuit 114, the computing circuit 124, and the computing circuit 134 may be circuits or electronic components with program execution capabilities, such as central processing units, microprocessors, micro-processing units, digital signal processors, application specific integrated circuits (ASIC), or their equivalents.

In some embodiments, the memory 112, the memory 122, and the memory 132 store a plurality of program instructions or codes, and the computing circuit 114, the computing circuit 124, and the computing circuit 134 respectively perform the functions of the wireless AP 110, the wireless repeater 120, and the wireless communication device 130 by executing the program instructions or codes. In an alternative embodiment, the computing circuit 114, the computing circuit 124, and the computing circuit 134 may be embodied by hardware circuits.

Note that for the wireless AP 110, the wireless repeater 120, and the wireless communication device 130, the sending and receiving of packets (or frames) is implemented through the control of the packet transceiver circuit 116, the packet transceiver circuit 126, and the packet transceiver circuit 136 by the computing circuit 114, the computing circuit 124, and the computing circuit 134, respectively.

Figure 2:
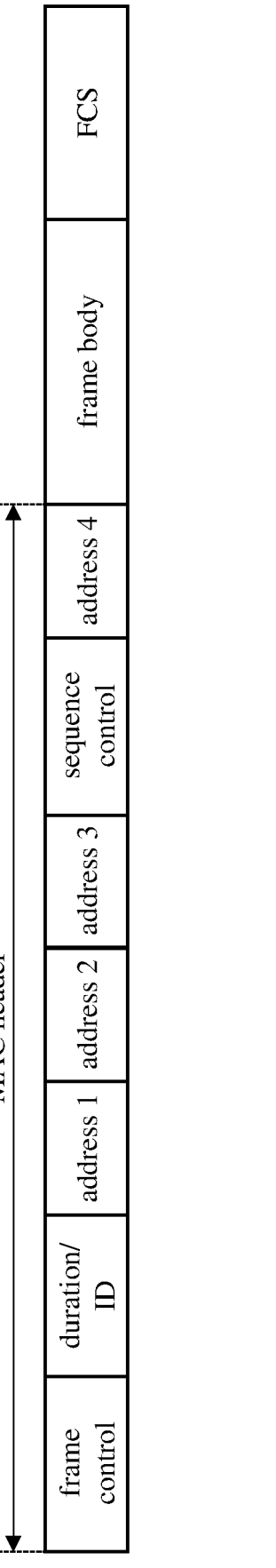
FIG. 2 shows a schematic diagram of the structure of an 802.11 frame.

FIG. 2 shows a schematic diagram of the structure of an 802.11 frame. An 802.11 frame usually includes the following fields: frame control, duration/ID, address 1, address 2, address 3, sequence control, address 4, frame body, and frame check sequence (FCS). People having ordinary skill in the art can know the purpose of each field from the 802.11 specification, so the details are omitted for brevity. When a frame is a Four-Address MAC header format frame, address 1 through address 4 all exist and have values. When a frame is a Three-Address MAC header format frame, address 1 through address 3 all exist and have values, but address 4 does not exist.

For the ease of discussion, "M0," "M1," "M2," and "M3" represent the MAC addresses of the wireless AP 110, the wireless repeater 120, the wireless communication device 130, and another device, respectively. The receiver address of a frame is referred to as RA, the transmitter address is referred to as TA, the destination address is referred to as DA, and the source address is referred to as SA.

Embodiment 1

Figure 3A:
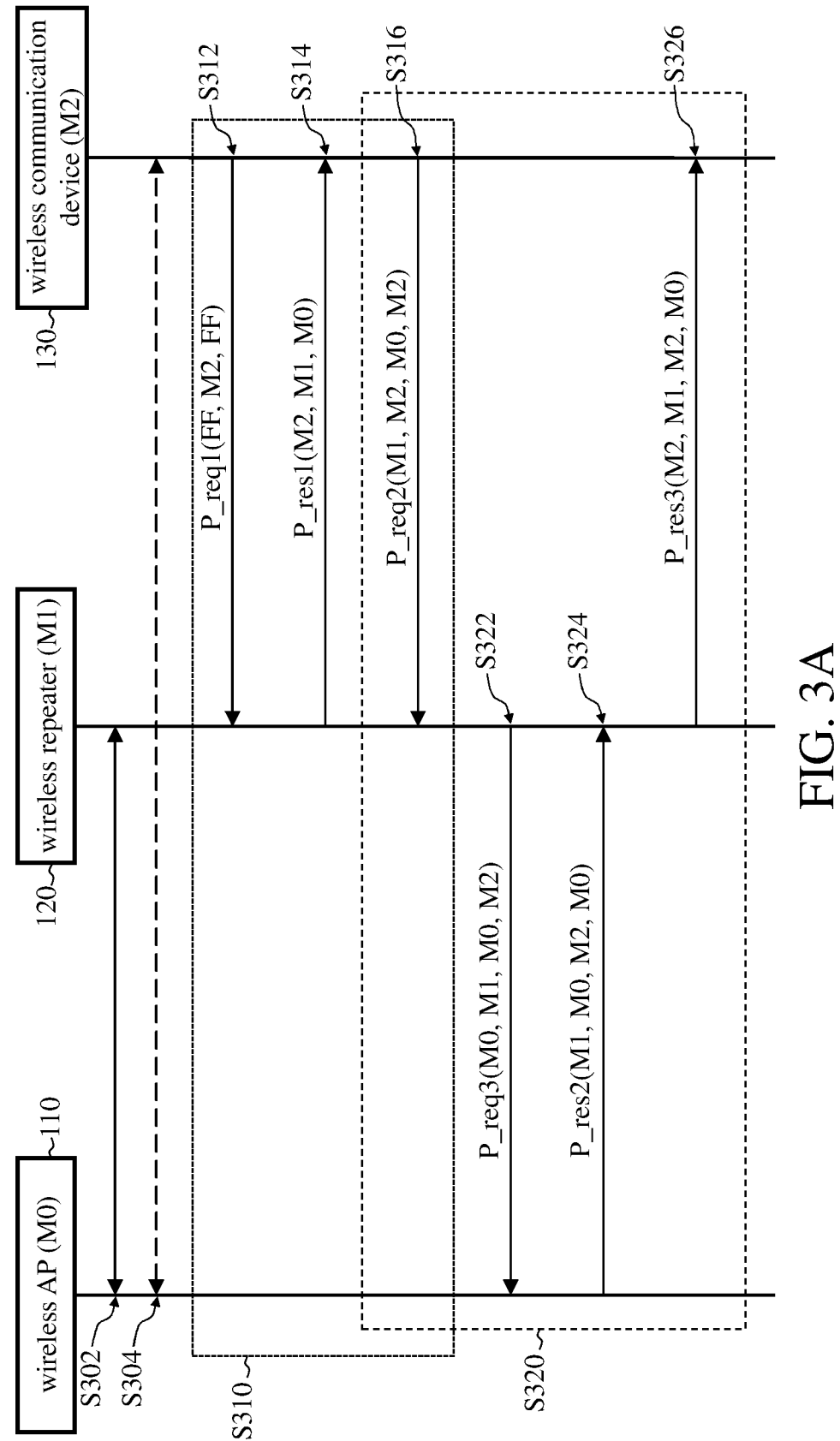
FIG. 3A to 3B are sequence diagrams of the wireless communication system according to an embodiment of the present invention.
Figure 3B:
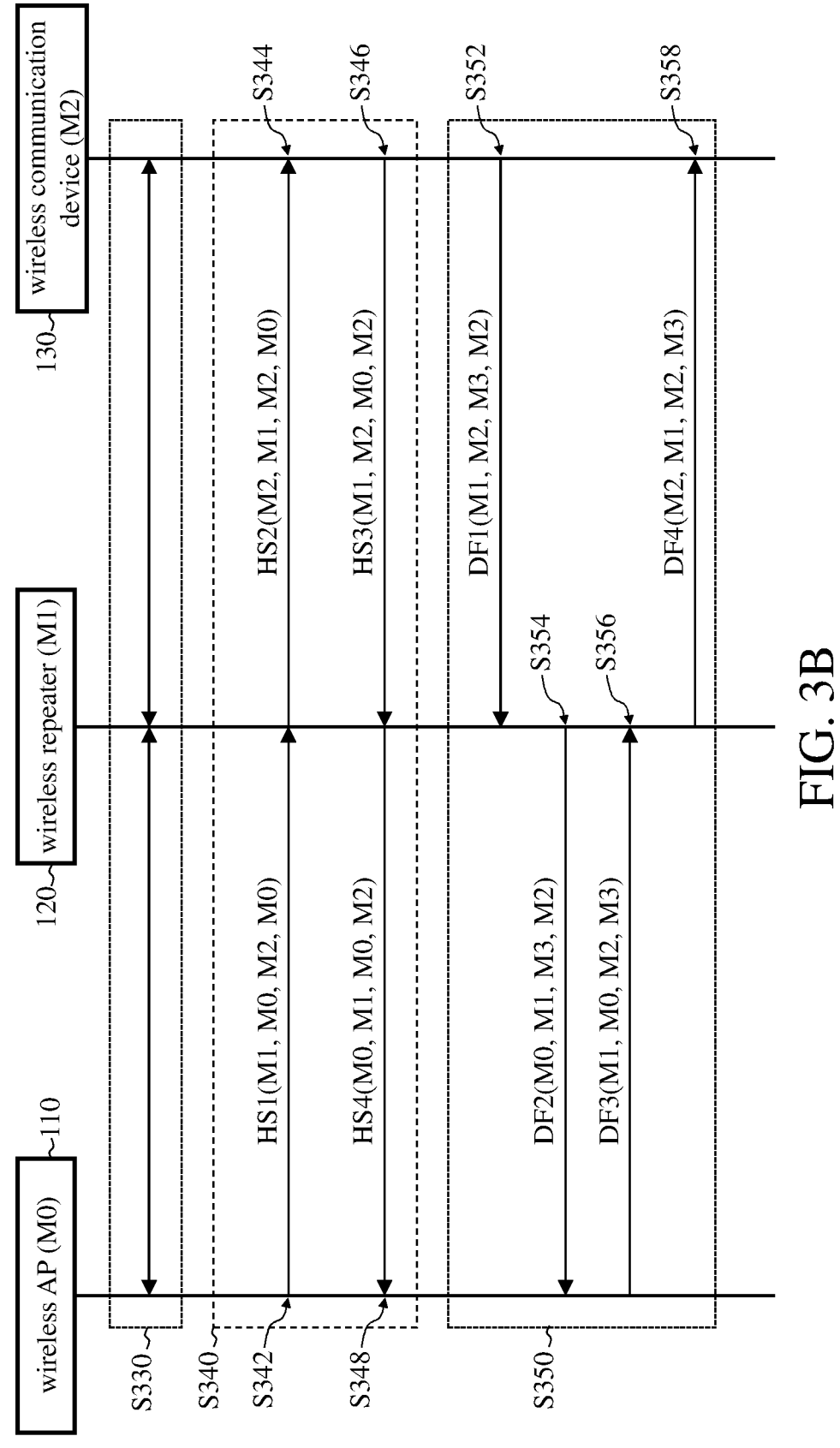

FIGS. 3A to 3B are sequence diagrams of the wireless communication system according to an embodiment of the present invention. The information exchange between the wireless AP 110, the wireless repeater 120, and the wireless communication device 130 in FIG. 1 are discussed below with reference to FIGS. 3A-3B.

Step S302: The wireless repeater 120 is connected to the wireless AP 110. In this step, the wireless repeater 120 and the wireless AP 110 perform key negotiation to derive a pairwise transient key PTK1. However, the pairwise transient key PTK1 is used only in step S302 and is not used thereafter when the wireless repeater 120 forwards the packets exchanged between the wireless AP 110 and the wireless communication device 130. In addition, if the wireless repeater 120 forwards packets exchanged between other wireless communication devices and wireless APs that do not support the present invention, the decryption and encryption process will still be performed and the pairwise transient key PTK1 will be used.

Step S304: The wireless communication device 130 attempts to connect with the wireless AP 110, but the connection cannot be established (e.g., because the signal is too weak). Therefore, next, the wireless communication device 130 attempts to establish a forwarding relationship with the wireless repeater 120 (step S310). Step S310 includes step S312, step S314 and step S316.

Step S312: The wireless communication device 130 sends a first probe request P_req1 to the wireless repeater 120. The address field of the 802.11 MAC header of the first probe request P_req1 is in a Three-Address MAC header format, wherein RA is the broadcast MAC address (FF), TA is the MAC address of the wireless communication device, and the Basic Service Set Identification (BSSID) field is the broadcast MAC address. The first probe request P_req1 carries a vendor-specific information element (e.g., the vendor is the manufacturer of the wireless communication device 130 and the element ID is 221) that is used to search the surrounding environment for devices implementing the repeating method of the present invention (e.g., the wireless repeater 120). When the wireless communication device 130 needs to specify the Service Set Identification (SSID) of the wireless AP to be connected, the wireless communication device 130 carries the specified SSID information in the vendor-specific information element. People having ordinary skill in the art can know how to use the specific information elements according to the 802.11 specifications, so the details are thus omitted for brevity.

Step S314: The wireless repeater 120 receives the first probe request P_req1, and parses its information elements. When the current state of the wireless repeater 120 can provide the repeating and forwarding service for the wireless communication device 130, the wireless repeater 120 responds with a first probe response P_res1. Then, the wireless communication device 130 receives the first probe response P_res1 sent by the wireless repeater 120, parses its information elements, and selects the optimal wireless repeater (e.g., the wireless repeater 120) to establish a connection with the wireless AP 110.

When selecting the optimal wireless repeater, the wireless communication device 130 comprehensively considers the capability and status information of the wireless repeater, such as the signal strength from the wireless repeater to the wireless AP 110, the hop counts from the wireless repeater to the wireless AP 110, the capability and current traffic of the wireless repeater itself, the signal strength of the wireless repeater received by the wireless communication device 130, and the rate set, the aggregation capability, etc. supported by the wireless repeater.

The 802.11 MAC header address field of the first probe response P_res1 is in a Three-Address MAC header format ((RA, TA, BSSID)=(M2, M1, M0)), and the first probe response P_res1 carries the vendor-specific information elements that include the MAC address information of the wireless AP 110, the SSID information of the wireless AP 110, and the current capability information and state information of the wireless repeater 120 to allow the wireless communication device 130 to select the optimal wireless repeater and stores the MAC addresses and other information of the optimal wireless repeater 120 and the wireless AP 110 when receiving the first probe responses from multiple wireless repeaters.

After the wireless repeater 120 (i.e., the device supporting the repeating function discussed in the present invention) receives the first probe request P_req1, the forms of implementation that the wireless repeater 120 may need to consider include: (1) If the wireless repeater 120 is not connected to the wireless AP 110, the wireless repeater 120 will not respond to the probe request of the wireless communication device 130; (2) If the first probe request P_req1 carries the SSID of the target wireless AP and the SSID is different from the SSID of the wireless AP to which the wireless repeater 120 is currently connected, the wireless repeater 120 will not respond to the probe request of the wireless communication device 130; (3) If the current state of the wireless repeater 120 is not suitable for performing repeating and forwarding for other devices (for example, when the wireless repeater 120 has already been performing repeating and forwarding for many wireless communication devices, the current traffic of the wireless repeater 120 itself is relatively large, or the signal from the wireless repeater 120 to the wireless AP 110 is too weak, etc.), the wireless repeater 120 will not respond to the probe request of the wireless communication device 130.

The above probe request and probe response are a type of management frame defined by the wireless protocol (802.11).

Step S316: After parsing at least one probe response, the wireless communication device 130 stores the MAC address and capability information of the optimal wireless repeater (e.g., the wireless repeater 120), sends a second probe request P_req2 that is used to confirm the repeating relationship with the selected wireless repeater (e.g., the wireless repeater 120), and query the wireless AP 110 for its capability information. The four addresses (RA, TA, DA, SA) of the second probe request P_req2 are (M1, M2, M0, M2). All subsequent management frames and data frames exchanged between the wireless communication device 130 and the wireless AP 110 are forwarded through the selected wireless repeater, and the 802.11 MAC headers are in a Four-Address MAC header format. Then, the wireless repeater 120 receives and parses the second probe request P_req2, stores the MAC address and capability information of the wireless communication device 130, and establishes a repeating and forwarding table according to the MAC address of the wireless AP 110 and the MAC address of the wireless communication device 130 to establish a repeating and forwarding relationship between the wireless communication device 130 and the wireless AP 110. At this point, the wireless repeater 120 has established a forwarding relationship with the wireless communication device 130.

Step S316 is part of step S310 (in which the wireless communication device 130 attempts to establish a forwarding relationship with the wireless repeater 120) and is also part of step S320 (in which the wireless communication device 130 exchanges Four-Address MAC header management frames with the wireless repeater 120). Step S320 further includes steps S322, S324, and S326.

Step S322: In response to the second probe request P_req2, the wireless repeater 120 constructs and sends the third probe request P_req3, whose four addresses (RA, TA, DA, SA) are (M0, M1, M0, M2), whose frame body is identical to the frame body of the second probe request P_req2, and whose FCS field is recalculated. Note that for the 802.11 frames forwarded by the wireless repeater 120, after the information in the 802.11 MAC header is modified, the FCS must be recalculated, which will not be specifically explained later.

Step S324: The wireless AP 110 receives and parses the third probe request P_req3 to obtain capability information of the wireless communication device 130. After receiving the packet forwarded by the wireless repeater 120, the wireless AP 110 parses the 802.11 MAC header and generates a forwarding table according to the MAC address of the wireless repeater 120 and the MAC address of the wireless communication device 130 to establish the forwarding relationship between the wireless AP 110 and the wireless communication device 130. Afterwards, when the wireless AP 110 is about to send a packet to the wireless communication device 130, the wireless AP 110 constructs an 802.11 frame according to the forwarding table. In the 802.11 frame, the address field of the 802.11 MAC header is in a Four-Address MAC header format, RA is the MAC address of the wireless repeater 120, TA is the MAC address of the wireless AP 110, DA is the MAC address of the wireless communication device 130, and SA is the MAC address of the wireless AP 110. The wireless AP 110 then constructs and sends the second probe response P_res2 whose four addresses (RA, TA, DA, SA) are (M1, M0, M2, M0).

Step S326: The wireless repeater 120 receives the second probe response P_res2 and constructs and sends the third probe response P_res3 whose four addresses (RA, TA, DA, SA) are (M2, M1, M2, M0) and whose frame body is identical to the frame body of the second probe response P_res2. The wireless communication device 130 then receives the third probe response P_res3, parses the information elements, and obtains the capability information of the wireless AP 110.

In step S320, by forwarding through the wireless repeater 120, the wireless communication device 130 and the wireless AP 110 complete the exchange of Four-Address MAC header management frames.

In the conventional technology, during the connection of a wireless communication device to a wireless AP, the 802.11 MAC header of the exchanged management frames is in a Three-Address MAC header format, and the management frames are exchanged directly between the wireless communication device and the wireless AP without being forwarded through the wireless repeater 120. If the wireless communication device 130 and the wireless AP 110 cannot communicate directly due to the long distance, it is impossible to obtain the capability information of the other party and complete the association through the exchange of management frames. However, in the present invention, during the connection of the wireless communication device 130 to the wireless AP 110, the 802.11 MAC header of the exchanged management frames is in the Four-Address MAC header format and needs to be forwarded through the wireless repeater 120 to obtain the capability information of the other party and complete the association.

Next, reference is made to FIG. 3B. In step S330, the wireless communication device 130 and the wireless AP 110 exchange authentication requests and authentication responses and exchange association requests and association responses through the wireless repeater 120 that forwards the packets. The format of the MAC header of the 802.11 frames of the packets and the method of forwarding the packets are the same as the processes discussed above for the probe requests and probe responses.

Step S340: The wireless communication device 130 performs four handshakes to exchange data frames with the wireless AP 110 through the wireless repeater 120 to perform a key negotiation procedure, in which a pairwise transient key (PTK) is derived by negotiation. For the sake of brevity in the diagram, FIG. 3B shows only two of the four handshakes for exchanging data frames, including steps S342, S344, S346, and S348, where steps S342 and S344 represent the first exchange and steps S346 and S348 represent the second exchange.

Step S342: The wireless AP 110 sends the handshake packet HS1 to the wireless communication device 130, where the four addresses (RA, TA, DA, SA) are (M1, M0, M2, M0).

Step S344: The wireless repeater 120 receives the handshake packet HS1 sent by the wireless AP 110 to the wireless communication device 130, converts the MAC address of the handshake packet HS1 (changes RA from M1 to M2, changes TA from M0 to M1, and leaves DA and SA unchanged), and then sends the handshake packet HS2 to the wireless communication device 130.

Step S346: The wireless communication device 130 sends the handshake packet HS3 to the wireless AP 110, and the four addresses (RA, TA, DA, SA) of the handshake packet HS3 are (M1, M2, M0, M2).

Step S348: The wireless repeater 120 receives the handshake packet HS3 sent by the wireless communication device 130 to the wireless AP 110, converts the MAC address of the handshake packet HS3 (changes RA from M1 to M0, changes TA from M2 to M1, and leaves DA and SA unchanged), and then sends the handshake packet HS4 to the wireless AP 110.

After step S340 finishes, the wireless communication device 130 and the wireless AP 110 derive and install a PTK, and subsequent 802.11 data frames exchanged between the wireless communication device 130 and the wireless AP 110 must be encrypted and decrypted with the PTK. The details of deriving the PTK between the wireless AP 110 and the wireless communication device 130 are well known to people having ordinary skill in the art, so the details are omitted for brevity.

Note that step S340 is a key negotiation procedure between the wireless AP 110 and the wireless communication device 130. In this procedure, the wireless repeater 120 only functions as a repeater but is not involved in key negotiation. In addition, in the present invention, no key negotiation procedure is required between the wireless repeater 120 and the wireless communication device 130, and the wireless repeater 120 does not need to use the keys (including but not limited to the key PTK1 derived in step S302) to forward packets to the wireless AP 110 or the wireless communication device 130.

Step S350: The wireless communication device 130 communicates with another device (whose MAC address is M3) through the forwarding of packets by the wireless repeater 120 and the wireless AP 110. Step S350 includes the following steps.

Step S352: The wireless communication device 130 constructs the first data frame DF1 (whose four addresses (RA, TA, DA, SA) are (M1, M2, M3, M2)), and the frame body of the first data frame DF1 (i.e., the data carried in the first data frame DF1) is the data encrypted with the PTK obtained in the above step S340.

Step S354: After receiving the first data frame DF1 sent by the wireless communication device 130, the wireless repeater 120 modifies the 802.11 MAC header of the first data frame DF1 to generate the second data frame DF2 (whose four addresses (RA, TA, DA, SA) are (M0, M1, M3, M2)) and then sends the second data frame DF2 to the wireless AP 110. Note that the wireless repeater 120 directly forwards the 802.11 frame body without decrypting and encrypting it. In other words, the encrypted data carried in the second data frame DF2 is identical to the encrypted data carried in the first data frame DF1.

Step S356: After receiving the information sent by the other device to the wireless communication device 130, the wireless AP 110 constructs the third data frame DF3 (whose four addresses (RA, TA, DA, SA) are (M1, M0, M2, M3)), and the frame body of the third data frame DF3 (i.e., the data carried in the third data frame DF3) is the data encrypted with the PTK obtained in the above step S340.

Step S358: After receiving the third data frame DF3 sent by the wireless AP 110, the wireless repeater 120 modifies the 802.11 MAC header of the third data frame DF3 to generate a fourth data frame DF4 (whose four addresses (RA, TA, DA, SA) are (M2, M1, M2, M3)) and then sends the fourth data frame DF4 to the wireless communication device 130. Note that the wireless repeater 120 directly forwards the 802.11 frame body without decrypting and encrypting it. In other words, the encrypted data carried in the fourth data frame DF4 is identical to the encrypted data carried in the third data frame DF3. After receiving the fourth data frame DF4 forwarded by the wireless repeater 120, the wireless communication device 130 decrypts it with the above PTK to obtain the data sent by the other device to the wireless communication device 130.

The exchange of encrypted management frames between the wireless communication device 130 and the wireless AP 110 is the same as the exchange of data frames (i.e., step S350), so the details are omitted for brevity.

In the conventional repeating and forwarding method, the wireless repeater is required to decrypt and then encrypt the encrypted 802.11 frame body that is being forwarded. An association and a pairwise transient key PTK2 must be established between the wireless communication device and the wireless repeater; an association and a pairwise transient key PTK3 must be established between the wireless repeater and the wireless AP. Specifically, after receiving the encrypted 802.11 frame body sent by the wireless communication device, the wireless repeater finds the corresponding pairwise transient key PTK2 by looking up in a lookup table, performs decryption, and then sends the decrypted data to the upper module for processing. The upper module reconstructs a new 802.11 MAC header and finds the corresponding pairwise transient key PTK3 by looking up in a lookup table, encrypts the data to be forwarded, and generates the encrypted 802.11 frame body.

In the repeating and forwarding method of the present invention, after receiving the encrypted 802.11 frame body, the wireless repeater 120 is not required to decrypt and encrypt it again, which reduces system resource consumption and decrease forwarding latency. After receiving the 802.11 data frame forwarded by the wireless repeater 120, the wireless AP 110 finds the corresponding PTK by looking up according to the MAC address, decrypts it to obtain the data sent by the wireless communication device 130 to the other device, and then forwards the data to the other device.

Note that in 802.11 frames, control frames such as Request to Send (RTS), Clear to Send (CTS), acknowledge (ACK), block acknowledge (BA) are exchanged between two wireless devices in direct communication and do not need to be forwarded. In this embodiment, the control frames are processed in the same manner as in the traditional data exchange process, and the details are omitted for brevity. The wireless repeater provided by the present invention only needs to forward the management frames and the data frames between the wireless communication device and the wireless AP.

Embodiment 2

Based on the above embodiment, the wireless communication device 130 can communicate with the wireless AP 110 through the forwarding of packets by the wireless repeater 120. If the currently selected wireless repeater (i.e., the wireless repeater 120) is abnormally disconnected, or if the wireless communication device 130 determines that the current service experience cannot meet its needs due to network issues, the wireless communication device 130 can again initiate a request to establish the repeating relationship.

With reference to step S310 in FIG. 3A, the wireless communication device 130 sends the first probe request (reference may be made to the first probe request in Embodiment 1) and carries the SSID and BSSID of the specified wireless AP (e.g., the wireless AP 110) in the vendor-specific information element. The wireless repeater receives the first probe request and sends the first probe response (reference may be made to the first probe response in Embodiment 1). The wireless communication device 130 receives the first probe response, parses the information carried in the vendor-specific information element, and selects the optimal wireless repeater as the repeater to establish a connection with the specified wireless AP after comprehensive consideration. If the selected wireless repeater is the same as the original wireless repeater, it means that there is no better wireless repeater in the current network, and the wireless repeater between the wireless communication device 130 and the wireless AP remains unchanged. If the selected wireless repeater is different from the original wireless repeater, the wireless communication device 130 needs to establish a repeating and forwarding relationship with the new wireless repeater. For ease of discussion, the newly selected wireless repeater will be referred to as the wireless repeater 2 (whose MAC address is M4) in the following discussion.

The wireless communication device 130 sends the fourth probe request, wherein the 802.11 MAC header of the fourth probe request is in the Three-Address MAC header format ((RA, TA, BSSID)=(M4, M2, M0)), and the fourth probe request carries the vendor-specific information element to indicate that a repeating relationship is currently being established and the probe request does not need to be forwarded. The wireless repeater 2 receives the above fourth probe request, establishes a forwarding table, and sends a fourth probe response, wherein the 802.11 MAC header of the fourth probe response is in the Three-Address MAC header format ((RA, TA, BSSID)=(M2, M4, M0)).

Through the above steps, the wireless communication device 130 establishes a repeating relationship with the wireless repeater 2. Because the wireless communication device 130 has completed the association and 4-way handshake negotiations with the wireless AP 110 in the process discussed in Embodiment 1, the wireless communication device 130 does not need to reestablish the association (including the key negotiation procedure) with the wireless AP 110 in the process discussed in Embodiment 2. After that, packets exchanged between the wireless communication device and the wireless AP are forwarded through the wireless repeater 2. The forwarding method is the same as the method discussed in Embodiment 1, and the details are omitted for brevity.

Embodiment 3

Based on the above embodiment 1, through the repeating establishment and repeating and forwarding method provided by the present invention, multi-level repeating and signal amplification can be realized to expand the coverage of the entire network, thus providing wireless communication devices far from the wireless AP with better service experience.

Figure 4:
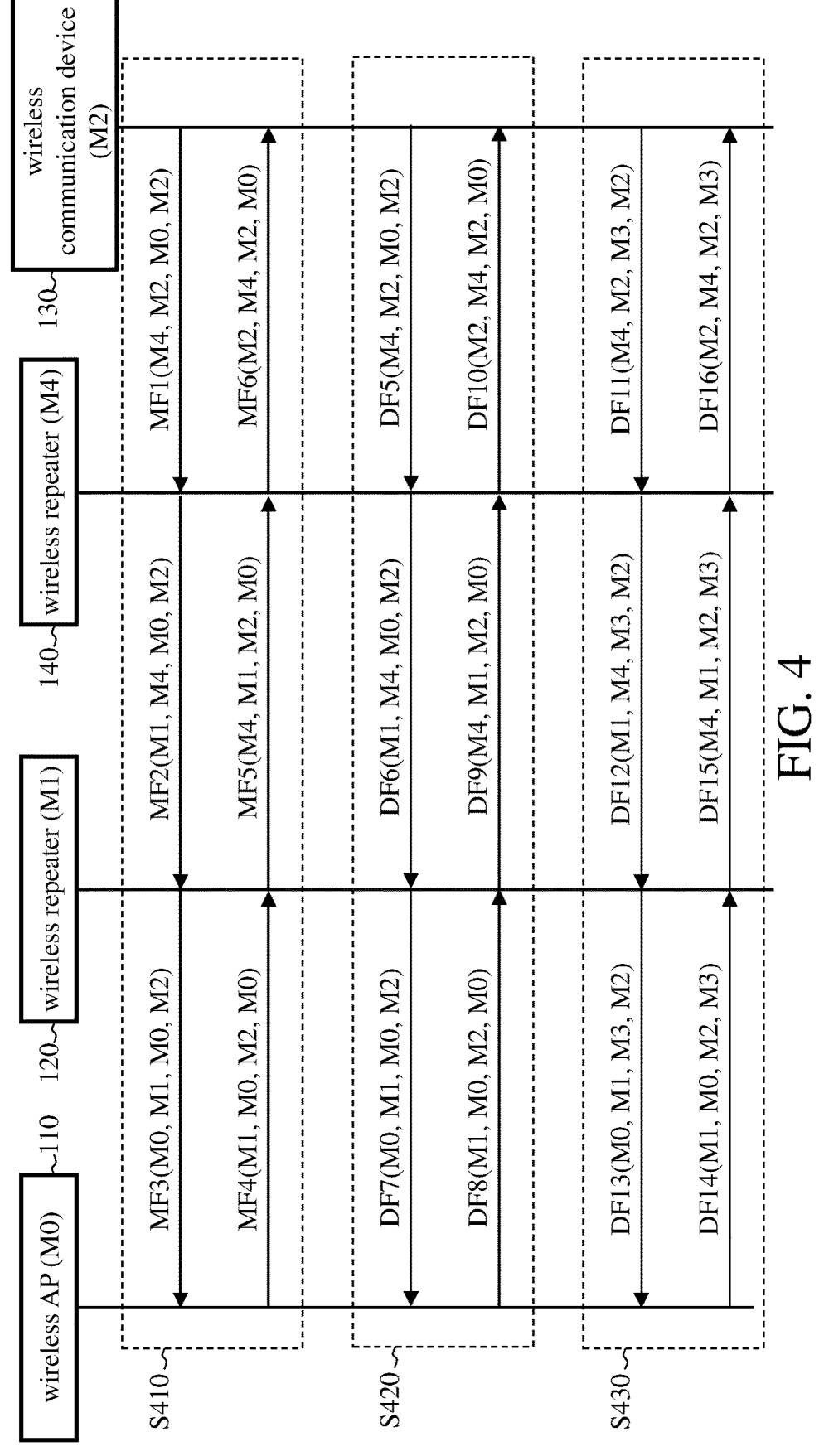
FIG. 4 is a sequence diagram of the wireless communication system according to another embodiment of the present invention.

Reference is made to FIG. 4, which is a sequence diagram of the wireless communication system according to another embodiment of the present invention. Management frames and data frames exchanged between the wireless communication device 130 and the wireless AP 110, and data frames exchanged between the wireless communication device 130 and the other device are forwarded through the wireless repeater 120 and the wireless repeater 140, wherein the MAC address of the wireless repeater 140 is represented by "M4." The process of establishing a forwarding relationship between the wireless communication device 130 and the wireless repeater 140 is the same as that discussed in Embodiment 1. The method of converting the 802.11 MAC header during the process of repeating and forwarding data is the same as that discussed in Embodiment 1, without the need for decrypting and then re-encrypting the encrypted data to be forwarded, and the details are omitted for brevity. FIG. 4 shows the exchange of management frames between the wireless communication device 130 and the wireless AP 110 (step S410, including management frames MF1-MF6), the exchange of data frames between the wireless communication device 130 and the wireless AP 110 (step S420, including data frames DF5-DF10), and the exchange of data between the wireless communication device 130 and the other device (whose MAC address is M3) (step S430, including data frames DF11-DF16).

The IEEE 802.11 network packets are intended to illustrate the invention by way of example and not to limit the scope of the claimed invention. People having ordinary skill in the art may apply the present invention to other types of network packets in accordance with the foregoing discussions.

Various functional components or blocks have been described herein. As appreciated by persons skilled in the art, in some embodiments, the functional blocks can preferably be implemented through circuits (either dedicated circuits, or general purpose circuits, which operate under the control of one or more processors and coded instructions), which typically comprise transistors or other circuit elements that are configured in such a way as to control the operation of the circuitry in accordance with the functions and operations described herein. As further appreciated by persons skilled in the art, the specific structure or interconnections of the circuit elements can typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Please note that the shape, size, and ratio of any element in the disclosed figures are exemplary for understanding, not for limiting the scope of this invention. Furthermore, there is no step sequence limitation for the method inventions as long as the execution of each step is applicable. In some instances, the steps can be performed simultaneously or partially simultaneously.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A wireless communication device, comprising:
a packet transceiver circuit; and
a computing circuit coupled to the packet transceiver circuit and configured
to control the packet transceiver circuit to send a first frame, wherein the first frame comprises a first receiver address, a first transmitter address, a first destination address, and a first source address, and
to control the packet transceiver circuit to receive a second frame, wherein the second frame comprises a second receiver address, a second transmitter address, a second destination address, and a second source address;
wherein the first frame is sent by the wireless communication device, and the second frame is received by the wireless communication device, and the first source address is identical to the second destination address, the second source address is identical to the first destination address, the first receiver address is identical to the second transmitter address, and the second receiver address is identical to the first transmitter address;
wherein before sending the first frame and receiving the second frame, the computing circuit is further configured
to control the packet transceiver circuit to send a first management frame, wherein the first management frame comprises a third receiver address, a third transmitter address, and a first basic service set identification (BSSID), and the third receiver address is a broadcast media access control address, the third transmitter address is a media access control address of the wireless communication device, and the first BSSID is the broadcast media access control address, and to control the packet transceiver circuit to receive a second management frame, wherein the second management frame comprises a fourth receiver address, a fourth transmitter address, and a second BSSID, and the fourth receiver address is the media access control address of the wireless communication device;
wherein the fourth transmitter address, the first receiver address, and the second transmitter address are identical.

2. The wireless communication device of claim 1, wherein the first frame and the second frame are management frames of an 802.11 communication protocol.

3. The wireless communication device of claim 1, wherein the first source address and the second source address belong to a same distribution system.

4. The wireless communication device of claim 1, wherein the first receiver address and the second transmitter address are media access control addresses of a wireless repeater, the wireless communication device is connected to a wireless access point (AP) through the wireless repeater, the first frame and the second frame are part of a key negotiation procedure, and the key negotiation procedure derives a pairwise transient key between the wireless communication device and the wireless AP.

5. The wireless communication device of claim 4, wherein the first frame further comprises a first data, the second frame further comprises a second data, and the first data and the second data are data encrypted with the pairwise transient key.

6. A wireless repeater in communication with a wireless communication device and a wireless access point (AP), the wireless repeater comprising:
a packet transceiver circuit; and
a computing circuit coupled to the packet transceiver circuit and configured
to control the packet transceiver circuit to receive a first frame from the wireless communication device or the wireless AP, wherein the first frame comprises a first receiver address, a first transmitter address, a first destination address, and a first source address, and
to control the packet transceiver circuit to send a second frame to the wireless AP or the wireless communication device, wherein the second frame comprises a second receiver address, a second transmitter address, a second destination address, and a second source address;
wherein the first frame is received by the wireless repeater, and the second frame is sent by the wireless repeater, and the first source address is identical to the second source address, the first destination address is identical to the second destination address, and the first receiver address is identical to the second transmitter address;
wherein before receiving the first frame and sending the second frame, the computing circuit is further configured
to control the packet transceiver circuit to receive a first management frame from the wireless communication device, wherein the first management frame comprises a third receiver address, a third transmitter address, and a first basic service set identification (BSSID), and the third receiver address is a broadcast media access control address, the third transmitter address is a media access control address of the wireless communication device, and the first BSSID is the broadcast media access control address, and to control the packet transceiver circuit to send a second management frame to the wireless communication device, wherein the second management frame comprises a fourth receiver address, a fourth transmitter address, and a second BSSID, and the fourth receiver address is the media access control address of the wireless communication device;

wherein the fourth transmitter address, the first receiver address, and the second transmitter address are identical.

7. The wireless repeater of claim 6, wherein the first frame and the second frame are management frames of an 802.11 communication protocol.

8. The wireless repeater of claim 6, wherein the first source address and the first destination address belong to a same distribution system.

9. The wireless repeater of claim 6, wherein the first frame further comprises a first data, the second frame further comprises the first data, the first data is a data encrypted with a pairwise transient key, and the pairwise transient key is a key between the wireless communication device and the wireless AP.

10. The wireless repeater of claim 9, wherein the wireless repeater does not decrypt the first data.

11. The wireless repeater of claim 6, wherein the first transmitter address is different from the second receiver address.

* * * * *